US010133957B2

(12) United States Patent
Tang et al.

(10) Patent No.: US 10,133,957 B2
(45) Date of Patent: Nov. 20, 2018

(54) METHOD AND DEVICE FOR RECOGNIZING OBJECT

(71) Applicant: Xiaomi Inc., Beijing (CN)

(72) Inventors: Mingyong Tang, Beijing (CN); Tao Chen, Beijing (CN); Huayijun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 96 days.

(21) Appl. No.: 15/155,385

(22) Filed: May 16, 2016

(65) Prior Publication Data

US 2016/0342858 A1 Nov. 24, 2016

(30) Foreign Application Priority Data

May 18, 2015 (CN) .......................... 2015 1 0253929

(51) Int. Cl.
*G06K 9/00* (2006.01)
*G06K 9/62* (2006.01)
*G06F 3/01* (2006.01)
*G06F 17/30* (2006.01)
*G06T 11/60* (2006.01)

(52) U.S. Cl.
CPC ............ *G06K 9/6201* (2013.01); *G06F 3/011* (2013.01); *G06F 17/30256* (2013.01); *G06F 17/30268* (2013.01); *G06K 9/00671* (2013.01); *G06T 11/60* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 8,239,130 B1* | 8/2012 | Upstill | G01C 21/3679 |
| | | | 701/400 |
| 9,599,477 B1* | 3/2017 | Aula | G01C 21/26 |
| 2008/0147730 A1* | 6/2008 | Lee | G06Q 30/0212 |
| 2011/0221896 A1* | 9/2011 | Haddick | G02B 27/017 |
| | | | 348/143 |
| 2011/0251920 A1* | 10/2011 | Watson | G01C 21/206 |
| | | | 705/26.9 |
| 2012/0062595 A1 | 3/2012 | Oh et al. | |
| 2013/0050258 A1 | 2/2013 | Liu et al. | |

(Continued)

FOREIGN PATENT DOCUMENTS

| | | | |
|---|---|---|---|
| CN | 101442678 A | 5/2009 | |
| CN | 102981616 A | 3/2013 | |

(Continued)

OTHER PUBLICATIONS

Combined Chinese Office Action and Search Report dated May 3, 2017 in Patent Application No. 201510253929.X (with English translation of Categories of Cited Documents).

(Continued)

*Primary Examiner* — Shervin Nakhjavan
(74) *Attorney, Agent, or Firm* — Oblon, McClelland, Maier & Neustadt, L.L.P.

(57) ABSTRACT

Aspects of the disclosure include a method for indicating a location of a first object by a wearable device. The method includes determining the first object; and, when a preset condition is satisfied, locating the first object and highlighting the first object on a display.

20 Claims, 10 Drawing Sheets

(56) References Cited

U.S. PATENT DOCUMENTS

| | | | |
|---|---|---|---|
| 2013/0178227 A1* | 7/2013 | Vartanian | G01S 15/08 455/456.1 |
| 2013/0265450 A1* | 10/2013 | Barnes, Jr. | H04N 5/77 348/207.1 |
| 2013/0275894 A1* | 10/2013 | Bell | G06F 3/0481 715/764 |
| 2014/0002496 A1* | 1/2014 | Lamb | G06F 3/14 345/633 |
| 2014/0044305 A1* | 2/2014 | Scavezze | G08B 21/24 382/103 |
| 2014/0152696 A1 | 6/2014 | Jung et al. | |
| 2014/0266647 A1 | 9/2014 | Visitacion et al. | |
| 2015/0042785 A1 | 2/2015 | Robertson | |
| 2015/0104069 A1 | 4/2015 | Li et al. | |
| 2015/0134689 A1* | 5/2015 | McClendon | G06F 17/30241 707/769 |
| 2015/0332566 A1 | 11/2015 | Visitacion et al. | |
| 2016/0057565 A1* | 2/2016 | Gold | H04W 4/008 455/41.1 |
| 2017/0148135 A1* | 5/2017 | Abramson | G06T 3/0018 |

FOREIGN PATENT DOCUMENTS

| | | |
|---|---|---|
| CN | 103155001 A | 6/2013 |
| CN | 103415849 A | 11/2013 |
| CN | 103813044 A | 5/2014 |
| CN | 204595327 U | 8/2015 |
| EP | 2 428 915 A2 | 3/2012 |
| EP | 2 778 854 A2 | 9/2014 |
| EP | 2 865 993 A1 | 4/2015 |
| JP | 2014-501984 A | 1/2014 |
| JP | 2014-93036 A | 5/2014 |
| JP | 2015-75832 A | 4/2015 |
| RU | 2 391 701 C2 | 6/2010 |
| WO | WO 2016/184104 A1 | 11/2016 |

OTHER PUBLICATIONS

Extended European Search Report dated Jan. 19, 2017 in Patent Application No. 16169063.1.
Japanese Office Action dated Aug. 24, 2017 in Patent Application No. 2017-518406.
Combine Russian Federation Office Action and Search Report dated May 24, 2017 in Patent Application No. 2016115038/08(023630) (with English translation of categories of cited documents).
Anonymous, "How to Locate Your Misplaced iPhone Using the Apple Watch [Video]" iClarified, Retrieved from the Internet: URL:http://www.iclarified.com/49009/how-to-locate-your-misplaced-iphone-using-the-apple-watch-video, XP055300097, May 7, 2015, 5 Pages.
Office Action dated Nov. 10, 2017 in Mexican Patent Application No. MX/a/2016/004985.
Office Action dated Jan. 3, 2018 in European Patent Application No. 16 169 063.1, 9 pages.

* cited by examiner

METHOD AND DEVICE FOR RECOGNIZING OBJECT

CROSS-REFERENCE TO RELATED APPLICATIONS

This application is based upon and claims priority to Chinese Patent Application No. 201510253929.X, filed May 18, 2015, the entire contents of which are incorporated herein by reference.

TECHNICAL FIELD

The present disclosure generally relates to the technical field of wearable devices, and more particularly, to a method and a device for indicating a location of an object by a wearable device.

BACKGROUND

In real life, objects such as remote controllers or fruit knives are frequently used but are often placed carelessly. People sometimes may forget where these objects are placed or these objects may be moved by other persons and cannot be found. This may create unnecessary troubles for users.

In some applications, sound activating method is used for finding objects. Specifically, a sound-activated device is disposed on an object. When a trigger condition is satisfied, the sound-activated device on the object is turned on to make sounds. Thus, users can find the object.

SUMMARY

Aspects of the disclosure include a method for indicating a location of a first object by a wearable device. The method includes determining the first object; and, when a preset condition is satisfied, locating the first object and highlighting the first object on a display.

In an embodiment, determining the first object includes recognizing a second object, and determining the first object by querying a pre-stored object association table according to information of the second object. In an embodiment, determining the first object includes obtaining object information corresponding to time and/or location parameters according to pre-stored behavior information, and determining the first object by querying the pre-stored object association table according to the object information. In an embodiment, determining the first object includes receiving information of a third object from an image recognition device, and determining the first object by querying the pre-stored object association table according to the information of the third object.

In an embodiment, the method further includes determining whether the preset condition is satisfied by performing one or more of: determining a current time corresponds to a time recorded in the pre-stored behavior information; or determining a current location corresponds to a location recorded in the pre-stored behavior information.

In an embodiment, the method further includes determining whether the preset condition is satisfied by performing one or more of: determining whether an angle variation of the wearable device exceeds a preset angle threshold; or determining whether a function of highlighting the first object on the display is activated.

In an embodiment, highlighting the first object on the display includes displaying the first object with a part or an entirety of the first object enlarged on the display; or displaying the first object in a flashing effect on the display.

Aspects of the disclosure include a method for indicating a location of a first object. The method includes obtaining, by a first device, information of a second object; and sending the information of the second object to a second device. In an embodiment, the second device is a wearable device. The wearable device may determine the first object according to the information of the second object, locate the first object when a preset condition is satisfied, and highlight the first object on the display.

In an embodiment, obtaining information of the second object includes scanning for a scanned object within a current view range of the first device; determining whether information of the scanned object is in a pre-stored object information table; and when the information of the scanned object is in the pre-stored object information table, determining the information of the scanned object as the information of the second object.

Aspects of the disclosure include a device for indicating a location of a first object. The device includes a processor; and a memory for storing instructions executable by the processor. The processor is configured to determine the first object, and, when a preset condition is satisfied, locate the first object and highlight the first object on a display.

In an embodiment, when determining the first object, the processor is configured to recognize a second object, and determine the first object by querying a pre-stored object association table according to information of the second object. In an embodiment, when determining the first object, the processor is configured to obtain object information corresponding to time and/or location parameters according to pre-stored behavior information, and determine the first object by querying the pre-stored object association table according to the object information. In an embodiment, when determining the first object, the processor is configured to receive information of a third object from an image recognition device, and determine the first object by querying the pre-stored object association table according to the information of the third object.

Aspects of the disclosure include a device for indicating a location of a first object. The device includes a processor; and a memory for storing instructions executable by the processor. The processor is configured to obtain information of a second object, and send the information of the second object to a second device. The second device is a wearable device. The wearable device determines the first object according to the information of the second object, locates the first object when a preset condition is satisfied, and highlights the first object on a display.

Aspects of the disclosure include a non-transitory computer-readable storage medium having stored therein instructions that, when executed by a processor of a wearable device, causes the wearable device to perform a method for indicating a location of an object. In an embodiment, the method includes determining the object; and when a preset condition is satisfied, locating the object and highlighting the object on a display.

Aspects of the disclosure include a non-transitory computer-readable storage medium having stored therein instructions that, when executed by a processor of an image recognition device, causes the image recognition device to perform a method for indicating a location of a first object. The method includes obtaining information of a second object; and sending the information of the second object to a wearable device so that the wearable device determines the first object according to the information of the second object, locates the first object when a preset condition is satisfied, and highlights the first object on a display.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise illustrated. The implementations set forth in the following description of exemplary embodiments do not represent all implementations consistent with the present disclosure. Instead, they are merely examples of devices and methods consistent with aspects related to the present disclosure.

Figure 1:
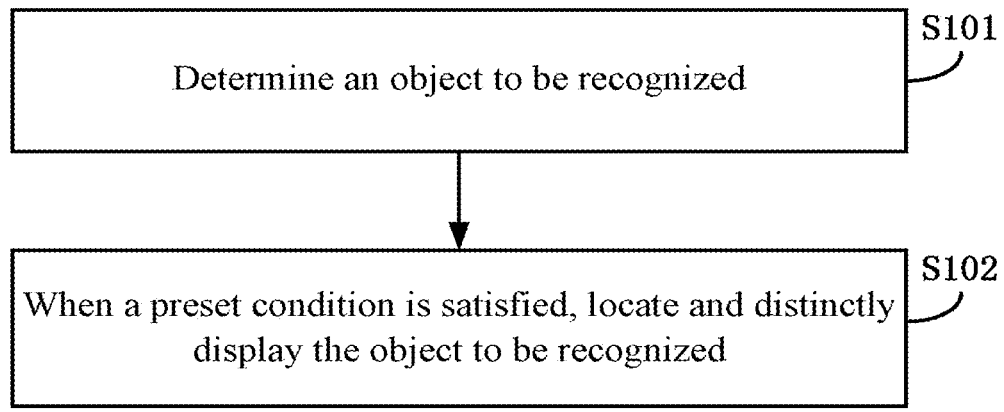
FIG. 1 is a flowchart showing a method for indicating a location of an object according to an exemplary embodiment.

FIG. 1 is a flowchart showing a method for indicating a location of an object according to an exemplary embodiment. As shown in FIG. 1, the method for indicating a location of an object may be applied in a wearable device, which may include but not limited to smart glasses, smart helmet, and the like. The method for indicating a location of an object may include the following steps S101-S102.

In step S101, an object of interest, such as a first object, whose location is to be indicated by a wearable device, is determined.

In the embodiment, the wearable device may determine the object of interest via various manners. For example, a current object, such as a second object, may be recognized, and the object of interest whose location is to be indicated may be determined by querying a pre-stored object association table according to information of the current object.

For example, if a user wants to find the remote controller of a TV, the user may wear smart glasses firstly, and then stares at the TV for a time period, for example, three seconds, so that the smart glasses can recognize that the current object is the TV. Then the wearable device can determine the object of interest whose location is to be indicated by querying an object association table. The object association table saves information regarding associations among various objects.

In some examples, the user stares at the current object such as the TV for a time period (for example three seconds or more) so as to improve the recognition efficiency. In an example scenario, it is assumed that the user wears the smart glasses and wants to find an object associated with an object A, but the user stares at an object B for one second unintentionally. If there is no threshold for the length of the time period for staring but the object is recognized immediately, the smart glasses may falsely recognize the object B. This will decrease the recognition efficiency of the smart glasses.

Further, before querying the object association table, the method may further include receiving and saving the above object association table.

In step S102, when a preset condition is satisfied, the object of interest whose location is to be indicated is located and distinctly displayed by highlighting the object on a display, such as a display of the wearable device.

In the embodiment, the preset condition refers to a condition for triggering the wearable device to distinctly display an object. For example, the preset condition may refer to that an angle variation of the wearable device exceeds a preset angle threshold. The preset angle threshold may be set according to actual requirements. In some examples, the preset condition may refer to that a function of highlighting the object of interest on the display of the wearable device is activated, such as a button for highlighting the object of interest on the display of the wearable device is turned on, and the like.

When the smart glasses meet the condition for highlighting the object of interest on the display, the location of the object, such as the remote controller, may be automatically found, and the object may be highlighted at a corresponding position on the display so that the user may find the object accordingly. The corresponding position may refer to a position within a preset range from the object. The preset range may be one centimeter, or three centimeters, or any suitable range, and specific range may be set according to factors such as the size of the object. The highlighting of the object of interest on the display may include enlarging the object, or displaying the object with a part of the object enlarged, or displaying the object with a flashing effect on the display. In one example, the flashing effect is implemented by firstly enlarging the object, then shrinking the object and then enlarging the object again. The above are some examples for distinctly displaying objects, but the present embodiment does not impose limitations on the manners for distinctly displaying of objects.

Figure 2:
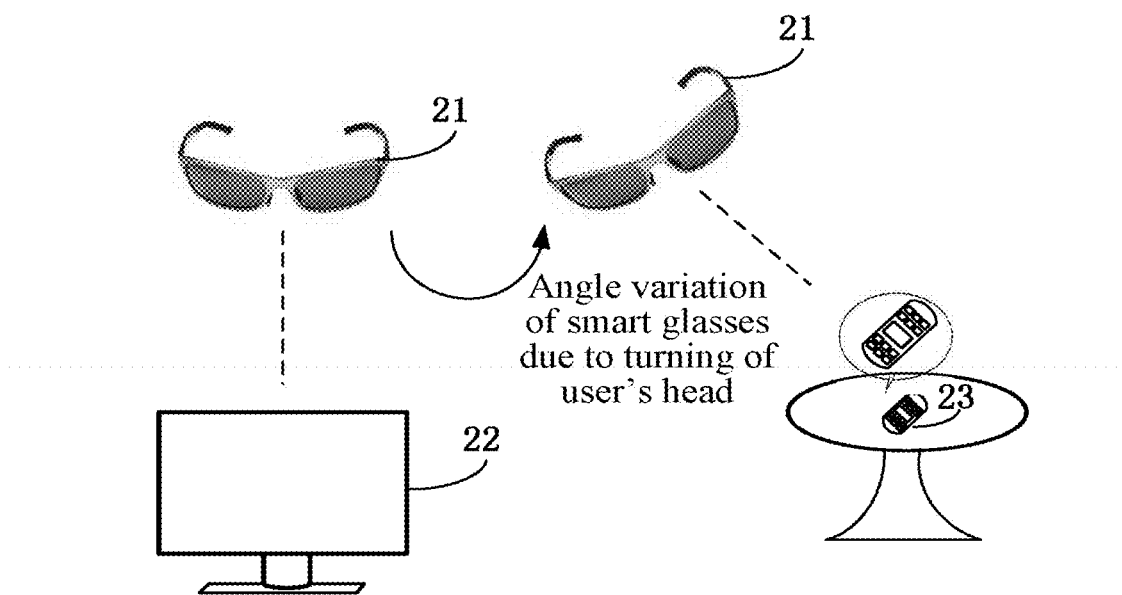
FIG. 2 is a schematic diagram showing a scenario for indicating a location of an object according to an exemplary embodiment.

The present disclosure will be illustratively described with reference to FIG. 2. As shown in FIG. 2, when a user cannot find the remote controller of a TV, the user may wear smart glasses 21 and then stare at the TV 22 for a predetermined time period such as five seconds. Then, the smart glasses 21 can recognize that the object which the user is currently staring at is the TV 22, and then query an object association table to determine that the object the user wants to find (i.e., the object of interest whose location is to be indicated by the smart glasses) is the remote controller 23 associated with the TV 22. When the user turns his/her head, the smart glasses 21 can detect that the angle variation exceeds a preset angle threshold, i.e., the triggering condition for distinctly displaying the whereabouts of objects is met, and then the smart glasses 21 can locate the remote controller 23 and indicate the location of the remote controller 23 in the field of view by, for example, enlarging the remote controller 23 on the display. The enlarging may be as shown in FIG. 2, for example, a bubble popped up at the position where the remote controller 23 is located, and an enlarged remote controller is displayed in the bubble.

Thus, by the method, a user may conveniently and timely find the object he/she wants to find. This method is especially suitable for people with poor vision, or is applicable in scenarios where the user is in an environment in the dim light, or where there are relatively many objects nearby the object of interest.

In the above embodiment of the method for indicating a location of an object, an object of interest is determined, and, when a preset condition is satisfied, the object of interest is located and distinctly displayed. Thus, a user may find a corresponding object timely. The implementations of the embodiment are simple and effective, and thus may help a user find an object that the user wants very conveniently.

In an embodiment, determining an object whose location is to be indicated may include one or more of the following operations.

One example operation may include recognizing a current object, and determining the object whose location is to be indicated by querying a pre-stored object association table according to information on the current object.

Another example operation may include obtaining object information corresponding to time and/or location parameters according to pre-stored behavior information, and determining the object whose location is to be indicated by querying a pre-stored object association table according to the object information.

Another example operation may include receiving information of an identified object from an image recognition device, and determining the object whose location is to be indicated by querying a pre-stored object association table according to the information of the identified object.

In an embodiment, before the determining an object whose location is to be indicated, the method may further include receiving and saving the object association table, where the object association table includes information regarding associations among various objects.

In an embodiment, before obtaining object information according to pre-stored behavior information and the corresponding time and/or location parameters, the method may further include one or more of the following operations.

One operation may include receiving behavior information input by a user through an input interface, and saving the behavior information.

One operation may include generating the behavior information based on detected parameters and saving the behavior information.

In an embodiment, the satisfaction of the preset condition may include one or more of the following operations.

One example operation may include determining whether an angle variation of the wearable device exceeds a preset angle threshold exceeds a preset angle threshold.

Another example operation may include determining whether a function of highlighting the object on the display of the wearable device is activated.

In an embodiment, the satisfaction of the preset condition may include one or more of the following conditions.

One example condition may include determining that a current time corresponds to a time recorded in the pre-stored behavior information.

Another example condition may include determining that a current location corresponds to a location recorded in the pre-stored behavior information.

In an embodiment, the distinctly displaying the object of interest may include one or more of the following operations.

One example operation may include displaying the object of interest with a part or an entirety of the object enlarged on the display of the wearable device.

Another example operation may include displaying the object of interest in a flashing effect on the display of the wearable device.

Examples with respect to how to indicate a location of an object of interest will be further illustrated in conjunction with the following embodiments.

As so far, it can be seen from the above descriptions that the methods provided by the embodiments of the present disclosure can help a user find an object that he/she wants very conveniently.

Hereinafter, the technical solutions provided by the embodiments of the present disclosure are described with reference to detailed embodiments.

Figure 3:
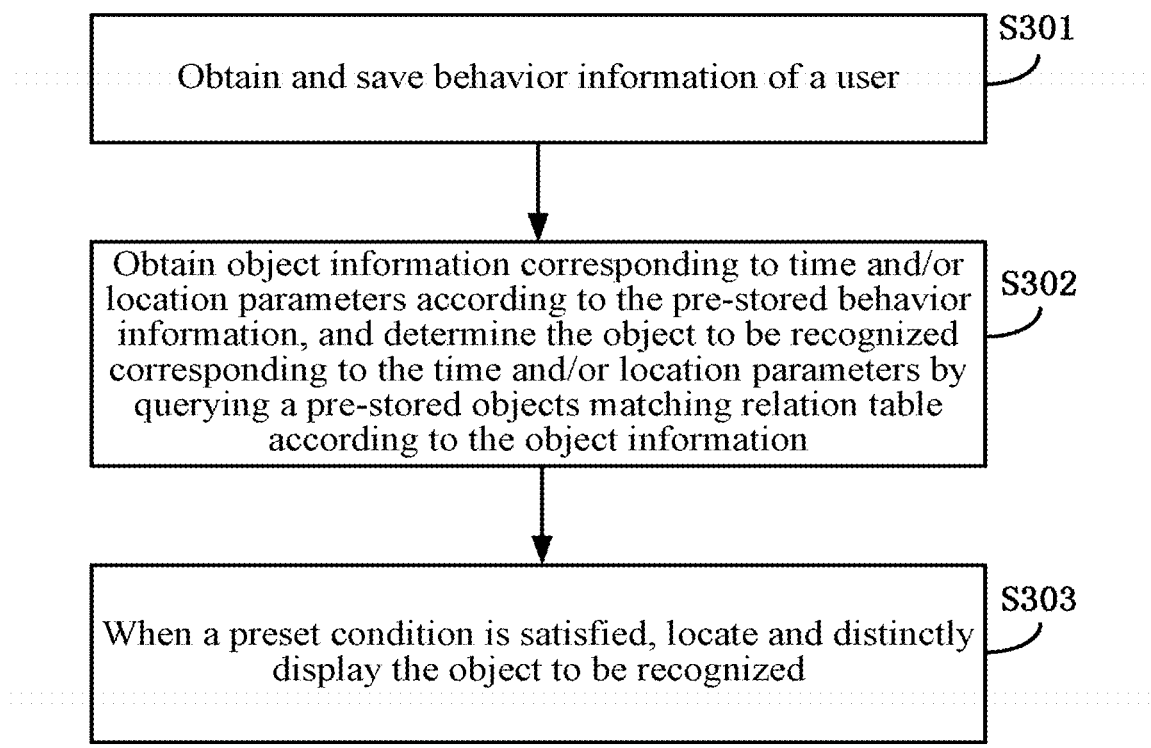
FIG. 3 is a flowchart showing another method for indicating a location of an object according to an exemplary embodiment.

FIG. 3 is a flowchart showing a method for indicating a location of an object, such as a first object, according to an exemplary embodiment. As shown in FIG. 3, the method includes the following steps S301-S303.

In step S301, behavior information of a user is obtained and saved.

In the embodiment, the wearable device (for example smart glasses) is capable of receiving behavior information manually input by the user and saving the behavior information, or automatically recording the user's behavior information based on parameters such as time synchronization, GPS location, or image recognition, and the like.

The behavior information may refer to behaviors relating to a certain object operated by a user at a certain location within a certain time period. For example, a user likes to watch ball games at the living room of his/her home from seven to eleven o'clock every Friday night. Or, the behavior information may refer to behaviors relating to a certain object operated by a user within a certain time period, or may refer to behaviors relating to a certain object operated by a user at a certain location.

In step S302, object information of an object, such as a second object, corresponding to time and/or location parameters is obtained according to the pre-stored behavior information, and the object whose location is to be indicated corresponding to the time and/or location parameters is determined by querying a pre-stored object association table according to the object information.

In the embodiment, the wearable device such as smart glasses may obtain object information corresponding to time and/or location parameters according to the pre-stored behavior information. For example, according to the piece of information that "the user likes to watch ball games at the living room of his/her home from seven to eleven o'clock every Friday night," the wearable device may determine that the object corresponding to the time (i.e., seven to eleven o'clock every Friday night) and the location (i.e., the living room of the home) is the TV, and then may determine that the object whose location is to be indicated is the remote controller associated with the TV according to the object association table.

In step S303, when a preset condition is satisfied, the object whose location is to be indicated is located and distinctly displayed.

In the embodiment, when the smart glasses detect that a current time reaches a time recorded in the pre-stored behavior information and/or when a current location is a location recorded in the pre-stored behavior information, the smart glasses automatically find the location of the object of interest (for example, the remote controller), and then distinctly display the object of interest at a corresponding position on the display so that the user may find the object timely. The corresponding position may refer to a position within a preset range from the object. The preset range may be two or four centimeters and so on. The distinct displaying of the object may include enlarging the object, or displaying the object with a part of the object enlarged, or displaying the object with a flashing effect, i.e., firstly enlarging the object, then shrinking the object and then enlarging the object again.

It can be seen from the above descriptions that in the above embodiments, the wearable device such as smart glasses can distinctly display the object the user wants to find within a particular recorded time according to the behavior information recorded by the user, and thereby help the user conveniently find the object he/she needs.

Figure 4:
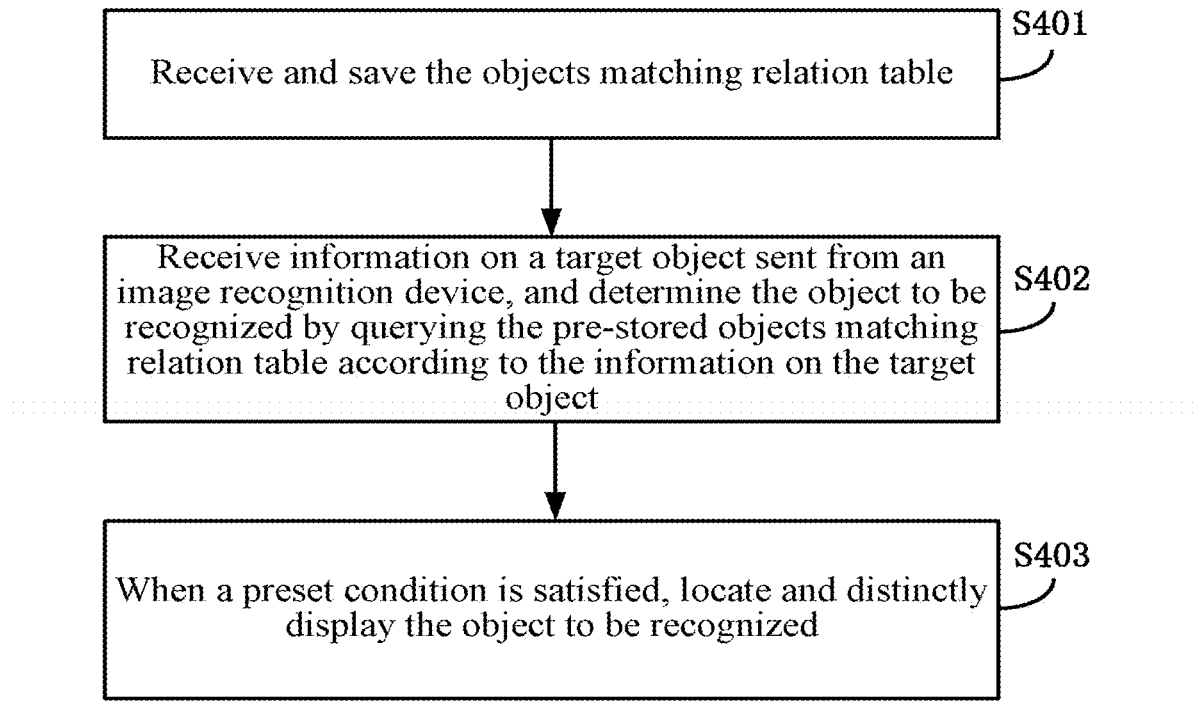
FIG. 4 is a flowchart showing another method for indicating a location of an object according to an exemplary embodiment.

FIG. 4 is a flowchart showing a method for indicating a location of an object, such as a first object, according to an exemplary embodiment. As shown in FIG. 4, the method includes the following steps S401-S403.

In step S401, the object association table is received and saved.

In the embodiment, the wearable device such as smart glasses may receive the object association table input by the user and save the object association table.

In step S402, information of an identified object sent from an image recognition device is received, and the object to be recognized is determined by querying the pre-stored object association table according to the information of the identified object.

In the embodiment, the smart glasses may be incapable of recognizing a current object, such as a third object, when the current object is outside of a field of view of the smart glasses. For example, when the user wearing the smart glasses is smoking, the smart glasses cannot recognize the cigarette nearby the smart glasses. In order to address this problem, the object (for example the cigarette) may be recognized by other devices, for example image recognition devices such as a camera, and information of the object may be sent to the smart glasses from the image recognition devices. After receiving the information of the object, the smart glasses determine an associated object whose location is to be indicated by querying an object association table.

It shall be noted that the wearable device such as smart glasses may indicate whereabouts of a plurality of objects simultaneously. For example, the wearable device may indicate a location of the object (i.e., a lighter) associated with the cigarette as discussed above, or may indicate a location of the object (i.e., the remote controller) associated with the TV by the embodiments as shown in FIG. 1 or 3.

In step S403, when a preset condition is satisfied, the object whose location is to be indicated is located and distinctly displayed.

In the embodiment, when an angle variation of the wearable device exceeds a preset angle threshold, for example, 30 degrees, the wearable device may automatically find the location of the object of interest (for example the remote controller), and distinctly display the object of interest at a corresponding position on the display of the wearable device. Or, when a function of highlighting the object of interest on the display of the wearable device is activated, such as when a button for distinct display on the wearable device is turned on, the wearable device may automatically find the location of the object of interest (for example the remote controller), and distinctly display the object of interest at a corresponding position on the display of the wearable device.

The distinct displaying of the object may be displaying the object with the object enlarged, or displaying the object with a part of the object enlarged, or displaying the object with a flashing effect, and the like.

Figure 5:
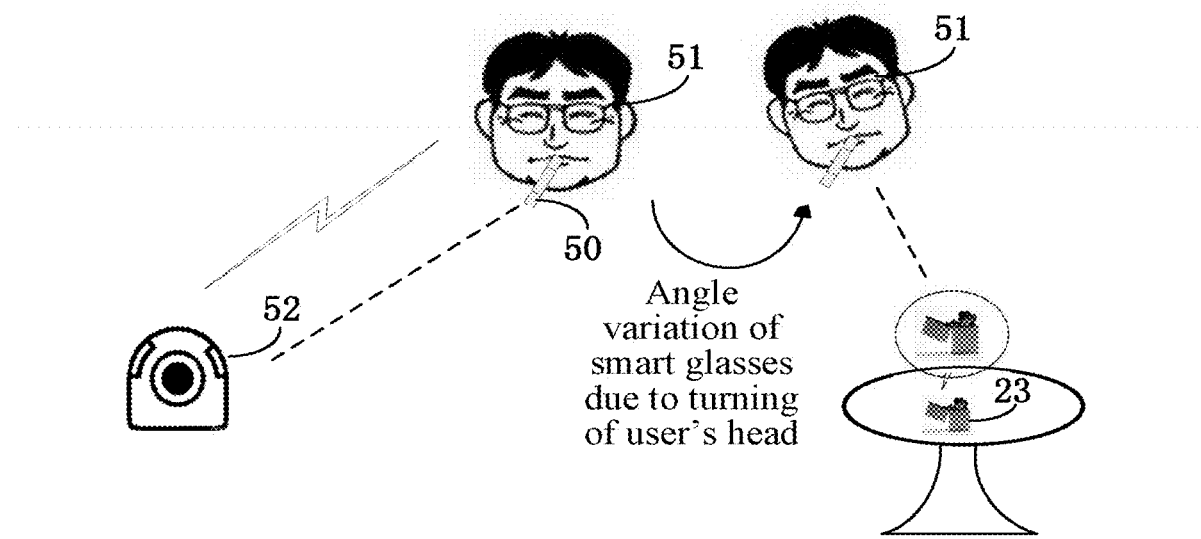
FIG. 5 is a schematic diagram showing a scenario for indicating a location of an object according to an exemplary embodiment.

The present disclosure will be illustratively described with reference to FIG. 5. As shown in FIG. 5, a user is watching TV at the living room with a cigarette 50 in mouth but he cannot find the lighter. Then, the user wears the smart glasses 51 to find the lighter. However, the smart glasses 51 cannot identify the cigarette, while a camera 52 in the living room can identify the cigarette 50 and determine that the identified cigarette 50 is in an object information table saved by the camera 52. Thus, the camera 52 sends the information of the cigarette 50 to the smart glasses 51 via Bluetooth or WM. After receiving the information of the cigarette 50, the smart glasses determine that the object associated the cigarette 50 is the lighter by querying a pre-stored object association table, and then automatically display the lighter with the lighter enlarged in the field of view.

It can be seen that by the image recognition device such as a camera and smart glasses, the user may conveniently find an object he/she wants.

Figure 6:
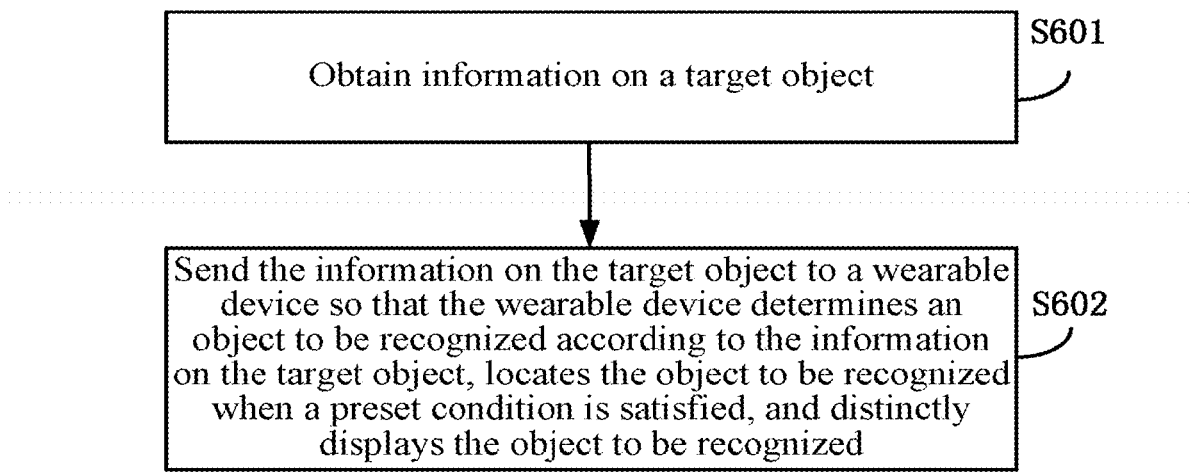
FIG. 6 is a flowchart showing another method for indicating a location of an object according to an exemplary embodiment.

FIG. 6 is a flowchart showing another method for indicating a location of an object according to an exemplary embodiment. The method may be applied in an image recognition device, which may include but not limited to a camera. The method may include the following steps S601-S602.

In step S601, information of an object is obtained.

In the embodiment, the information of an object may refer to information regarding objects which the smart glasses cannot identify, i.e., the objects with which an object to be found is associated, for example, the cigarette in FIG. 5.

In step S602, the information of the object is sent to a wearable device so that the wearable device determines an object of interest whose location is to be indicated by a display of the wearable device according to the information on the target object, locates the object of interest when a preset condition is satisfied, and distinctly displays the object of interest.

In the embodiment, after obtaining the information of the object identified by the image recognition device, the image recognition device may send the wearable device such as smart glasses the information of the identified object via Bluetooth or WIFI, and the like.

After receiving the information on the identified object, the wearable device determines an object of interest whose location is to be indicated on a display, and distinctly displays the object. The procedures for determining and distinctly displaying the object are similar to those in the embodiment as shown in FIG. 1, and detailed descriptions are omitted.

In the above embodiment of the method for indicating a location of an object, information of an identified object is obtained; and the information of the identified object is sent to a wearable device so that the wearable device determines an object of interest whose location is to be indicated on a display according to the information of the identified object, locates the object of interest when a preset condition is satisfied, and distinctly displays the object of interest. Thus, a user may find a corresponding object timely. The implementations of the embodiments are simple and effective, and thus may help a user find an object that the user wants very conveniently.

In an embodiment, obtaining information of an identified object may include scanning for an object within a current view range of an image recognition device; determining whether information of the scanned object is in a pre-stored object information table; and when the information of the scanned object is in the pre-stored object information table, determining the information of the scanned object as the information of the identified object.

In an embodiment, before determining whether the scanned object information is in a pre-stored object information table, the method may further include receiving and saving the object information table, where the object information table includes information of one or more objects associated with an object of interest whose location is to be indicated on a display.

Figure 7:
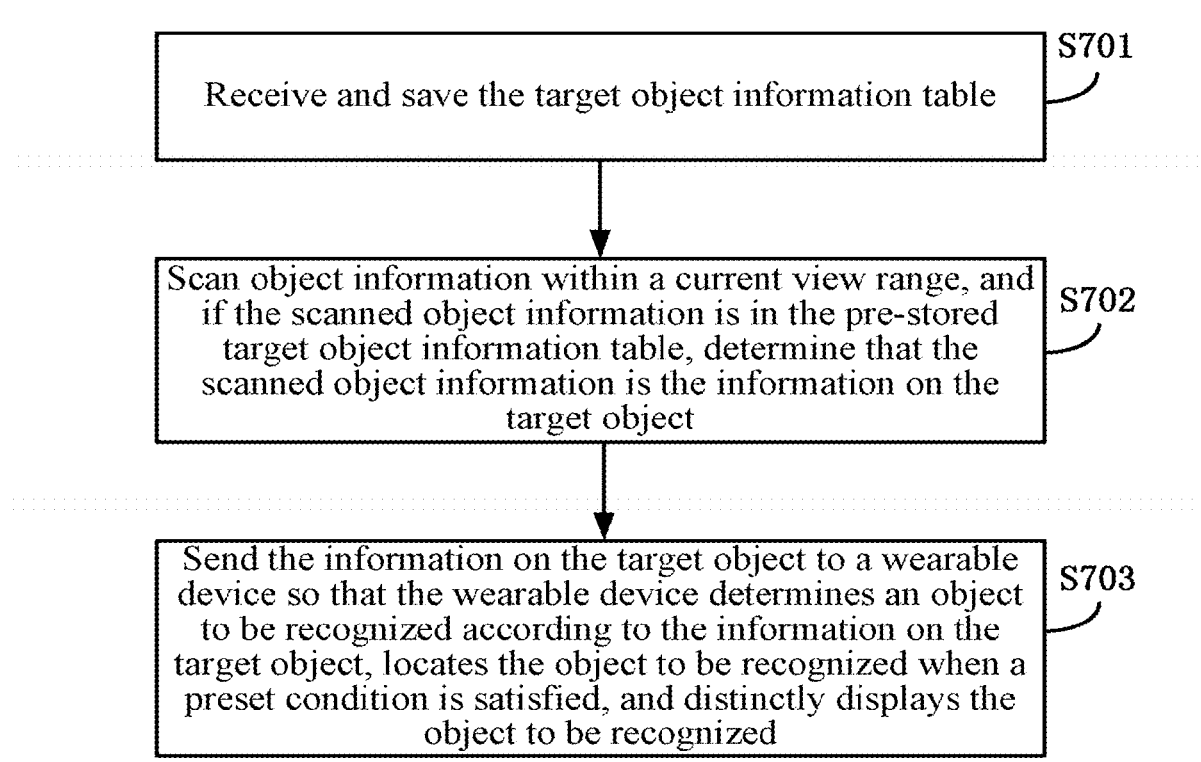
FIG. 7 is a flowchart showing another method for indicating a location of an object according to an exemplary embodiment.

FIG. 7 is a flowchart showing a method for indicating a location of an object according to an exemplary embodiment. The method may be applied in a camera and may include the following steps S701-S703.

In step S701, an object information table is received and saved.

In the embodiment, the camera saves the object information table for determining whether a recognized object is among the objects recorded in the object information table.

In step S702, an object within a current view range is scanned, and if the object information of the scanned object is in the pre-stored object information table, it is determined that the object information of the scanned object is the information of the identified object.

In the embodiment, the camera scans for an object within a current view range. It is assumed that the camera finds an object A by scanning. If the object A is in the object information table, the object A is determined as an identified object; otherwise, if the object A is not in the object information table, the object A is not determined as an identified object.

In step S703, the information of the identified object is sent to a wearable device so that the wearable device determines an object of interest whose location is to be indicated on a display according to the information of the identified object, locates the object of interest when a preset condition is satisfied, and distinctly displays the object of interest.

In the embodiment, after determining that the object A is the identified object, the camera sends the wearable device such as smart glasses the information of the object A. After receiving the information of the object A (for example, the cigarette), the wearable device determines that an object of interest associated with the cigarette is a lighter. When the user turns his/her head, i.e., the angle variation of the smart glasses is greater than a preset angle threshold, the smart glasses can display the lighter with a flashing effect.

In the above embodiments of methods for indicating a location of an object, information of an identified object is obtained by saving and querying an object information table; and the information of the identified object is sent to a wearable device so that the wearable device determines an object of interest whose location is to be indicated on a display according to the information of the identified object, locates the object of interest when a preset condition is satisfied, and distinctly displays the object of interest. Thus, a user may find a corresponding object timely. The implementations of the embodiments are simple and effective, and thus may help a user find an object that the user wants very conveniently.

Figure 8:
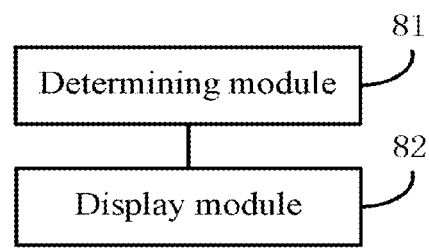
FIG. 8 is a block diagram showing a device for indicating a location of an object according to an exemplary embodiment.

FIG. 8 is a block diagram showing a device for indicating a location of an object according to an exemplary embodiment. The device may be applied in a wearable device. As shown in FIG. 8, the device for indicating a location of an object includes a determining module 81 and a display module 82.

The determining module 81 is configured to determine an object of interest whose location is to be indicated on a display.

The display module 82 is configured to, when a preset condition is satisfied, locate and distinctly display the object of interest which is determined by the determining module 81.

Figure 9A:
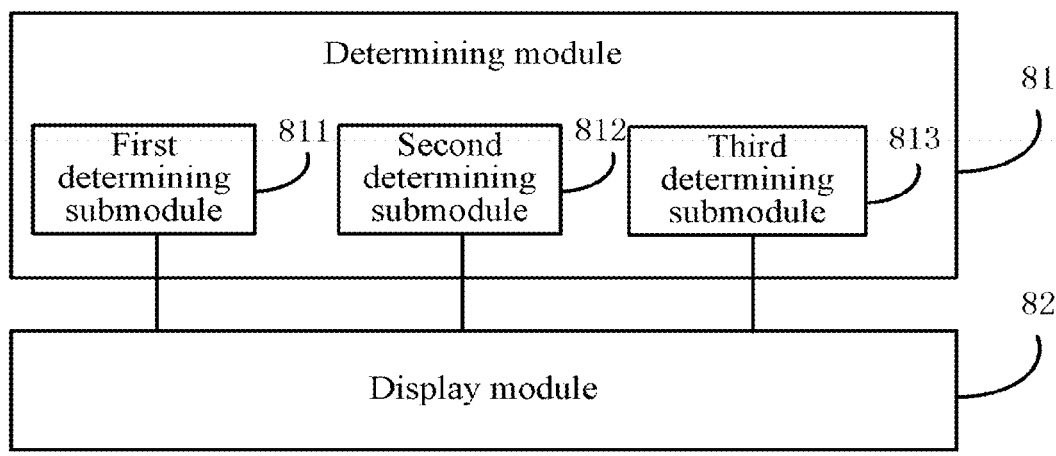
FIG. 9A is a block diagram showing another device for indicating a location of an object according to an exemplary embodiment.

FIG. 9A is a block diagram showing another device for indicating a location of an object according to an exemplary embodiment. On the basis of the embodiment as shown in FIG. 8, the determining module 81 as shown in FIG. 9A may include a first determining submodule 811, a second determining submodule 812, or a third determining submodule 813.

The first determining submodule 811 is configured to recognize a current object, and determine the object of interest whose location is to be indicated on a display by querying a pre-stored object association table according to information on the current object.

The second determining submodule 812 is configured to obtain object information corresponding to time and/or location parameters according to pre-stored behavior information, and determine the object of interest whose location is to be indicated on a display by querying a pre-stored object association table according to the object information.

The third determining submodule 813 is configured to receive information of an identified object sent from an image recognition device, and determine the object of interest whose location is to be indicated on a display by querying a pre-stored object association table according to the information of the identified object.

Figure 9B:
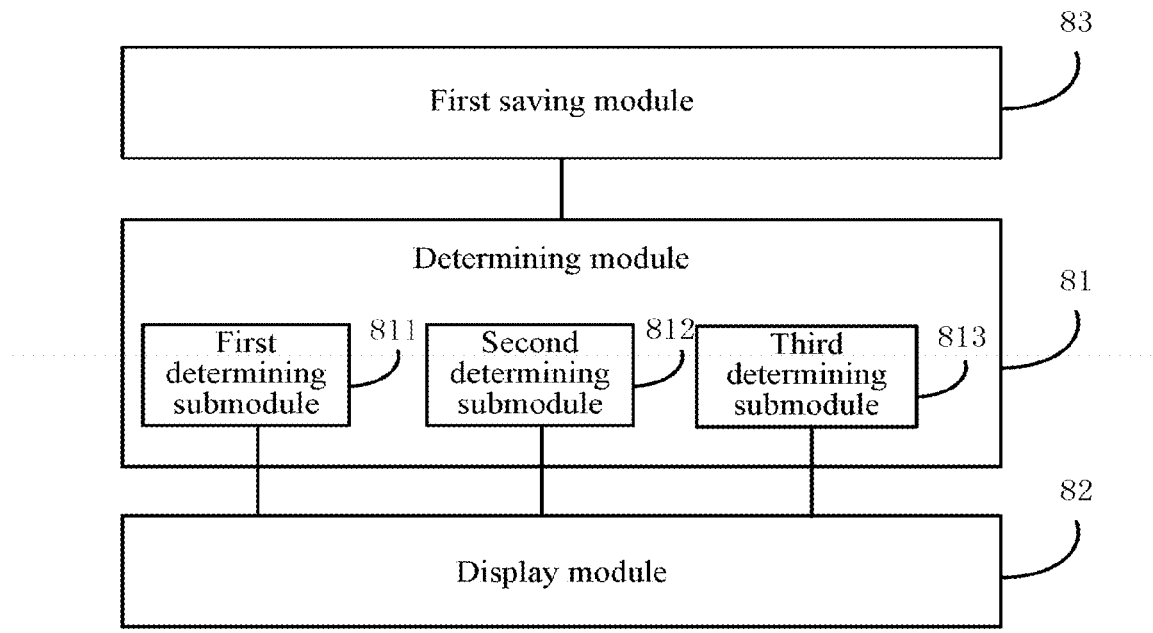
FIG. 9B is a block diagram showing another device for indicating a location of an object according to an exemplary embodiment.

FIG. 9B is a block diagram showing another device for indicating a location of an object according to an exemplary embodiment. On the basis of the embodiment as shown in FIG. 9A, the device as shown in FIG. 9B may further include a first saving module 83.

The first saving module 83 is configured to, before the determining module 81 determines the object of interest whose location is to be indicated on a display, receive and save the object association table, wherein the object association table includes information regarding associations among various objects.

Figure 9C:
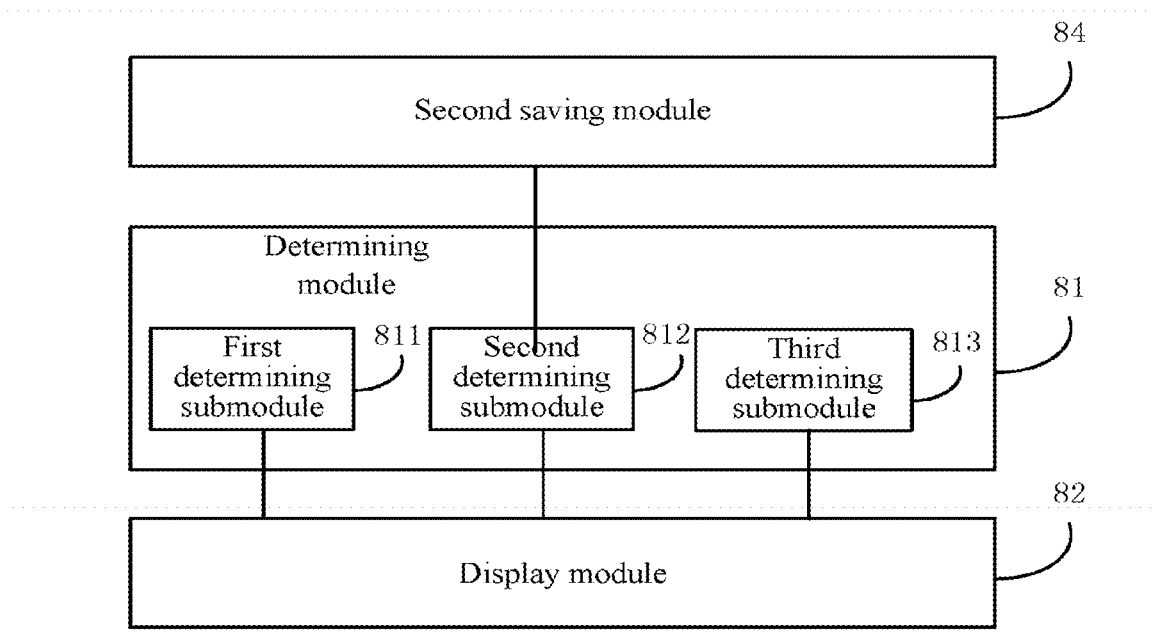
FIG. 9C is a block diagram showing another device for indicating a location of an object according to an exemplary embodiment.

FIG. 9C is a block diagram showing another device for indicating a location of an object according to an exemplary embodiment. On the basis of the embodiment as shown in FIG. 9A, the device as shown in FIG. 9C may further include a second saving module 84.

The second saving module 84 is configured to, before the second determining submodule 812 obtains object information corresponding to the time and/or location parameters according to the pre-stored behavior information, receive behavior information input by a user, and save the behavior information; or generating the behavior information of a user based on detected parameters and save the behavior information.

Figure 9D:
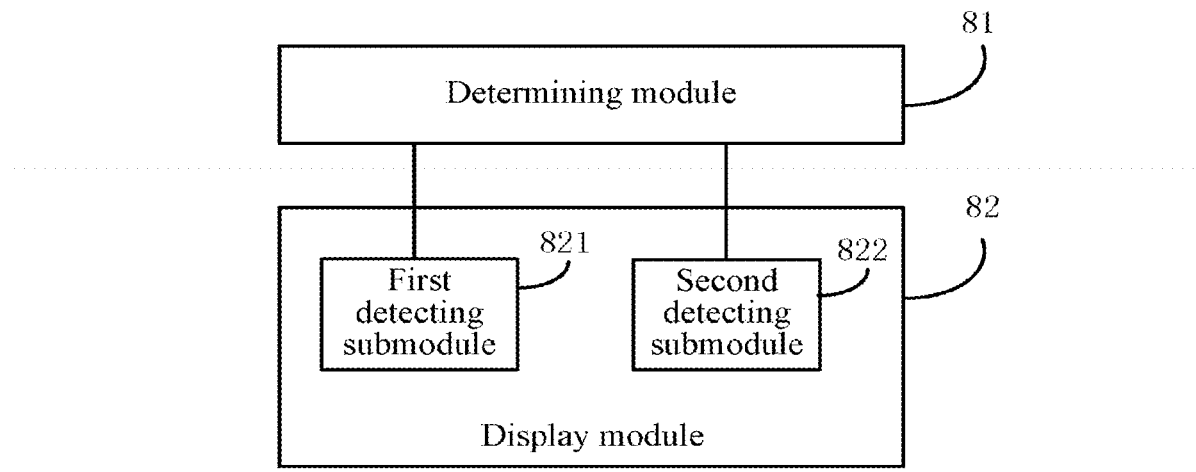
FIG. 9D is a block diagram showing another device for indicating a location of an object according to an exemplary embodiment.

FIG. 9D is a block diagram showing another device for indicating a location of an object according to an exemplary embodiment. On the basis of the embodiment as shown in FIG. 8, the display module 82 as shown in FIG. 9D includes a first detecting submodule 821 or a second detecting submodule 822.

The first detecting submodule 821 is configured to detect an angle variation of the wearable device and determine whether the angle variation exceeds a preset angle threshold.

The second detecting submodule 822 is configured to detect an on/off state of a button corresponding to a function of highlighting an object on a display and determine whether the button is turned on.

Further, the display module 82 as shown in FIG. 9A may also include the first detecting submodule 821 or the second detecting submodule 822, which are not shown in the drawing.

Figure 9E:
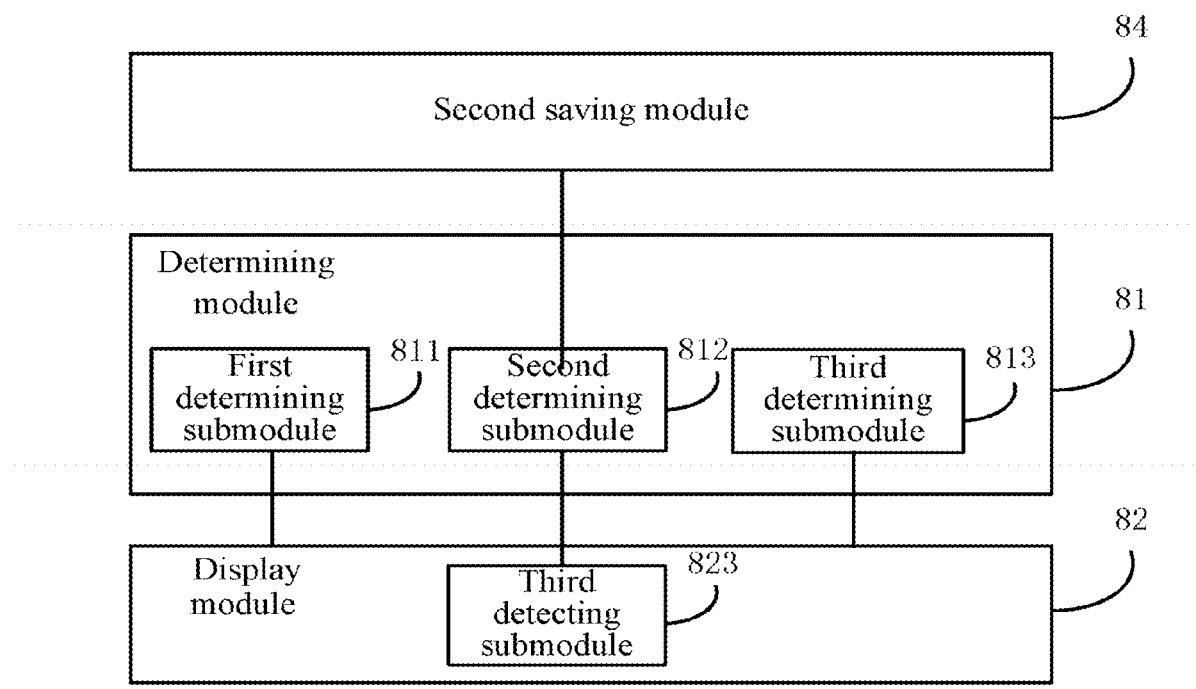
FIG. 9E is a block diagram showing another device for indicating a location of an object according to an exemplary embodiment.

FIG. 9E is a block diagram showing another device for identifying a location of an object according to an exemplary embodiment. On the basis of the embodiment as shown in FIG. 9C, the display module 82 as shown in FIG. 9E may include a third detecting submodule 823.

The third detecting submodule 823 is configured to determine whether a current time reaches a time recorded in the pre-stored behavior information; and/or determine whether a current location corresponds to a location recorded in the pre-stored behavior information.

Figure 9F:
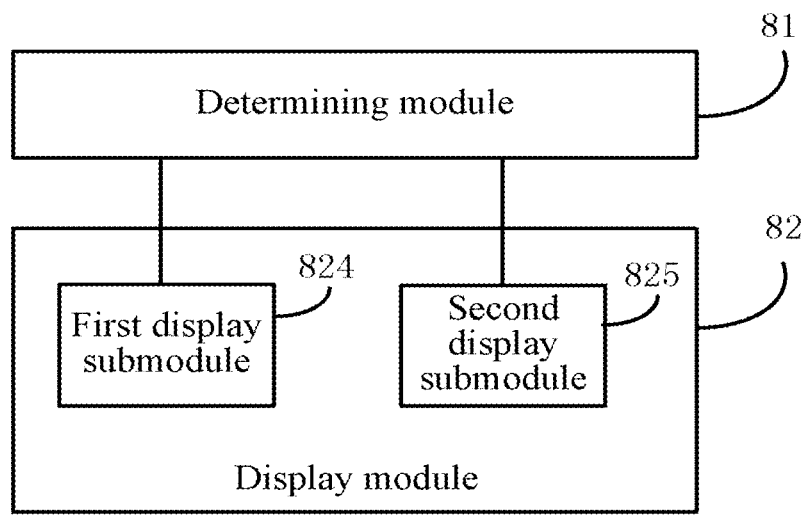
FIG. 9F is a block diagram showing another device for indicating a location of an object according to an exemplary embodiment.

FIG. 9F is a block diagram showing another device for identifying a location of an object according to an exemplary embodiment. On the basis of the embodiment as shown in FIG. 8, the display module 82 as shown in FIG. 9F may include a first display submodule 824 or a second display submodule 825.

The first display submodule 824 is configured to display the object of interest whose location is to be indicated on a display with a part or an entirety of the object enlarged.

The second display submodule 825 is configured to display the object of interest whose location is to be indicated on a display with a flashing effect.

Figure 10:
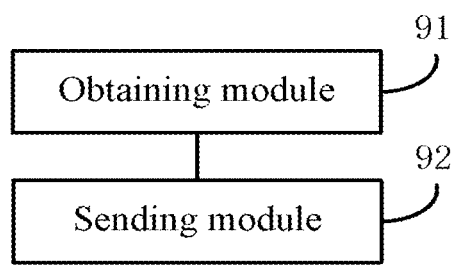
FIG. 10 is a block diagram showing another device for indicating a location of an object according to an exemplary embodiment.

FIG. 10 is a block diagram showing another device for identifying a location of an object according to an exemplary embodiment. As shown in FIG. 10, the device for recognizing an object includes an obtaining module 91 and a sending module 92.

The obtaining module 91 is configured to obtain information of an identified object.

The sending module 92 is configured to send the information of the identified object obtained by the obtaining module to a wearable device so that the wearable device determines an object of interest whose location is to be indicated on a display according to the information of the identified object, locates the object of interest when a preset condition is satisfied, and distinctly displays the object of interest.

Figure 11A:
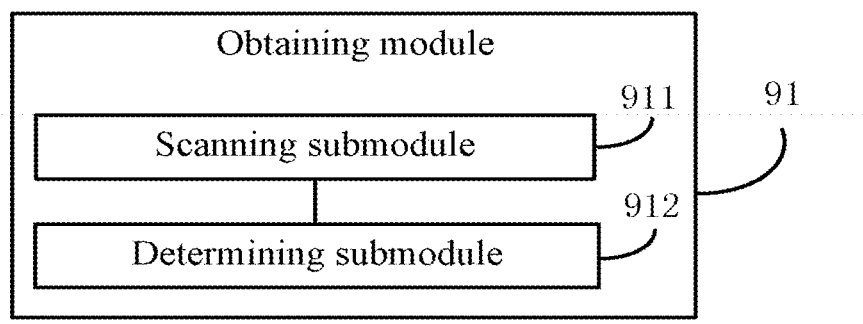
FIG. 11A is a block diagram showing another device for indicating a location of an object according to an exemplary embodiment.

FIG. 11A is a block diagram showing another device for identifying a location of an object according to an exemplary embodiment. On the basis of the embodiment as shown in FIG. 10, the obtaining module 91 as shown in FIG. 11A includes a scanning submodule 911 and a determining submodule 912.

The scanning submodule 911 is configured to scan for an object within a current view range.

The determining submodule 912 is configured to determine whether object information of a scanned object from the scanning submodule 911 is in a pre-stored object information table, and if the object information of the scanned object is in the pre-stored object information table, determine that the object information of the scanned object is the information of the identified object.

Figure 11B:
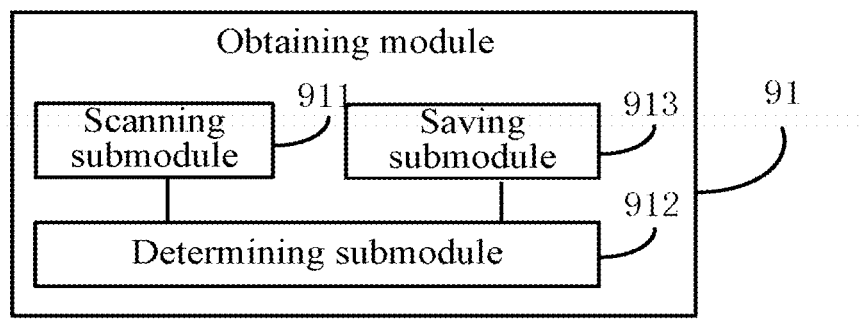
FIG. 11B a block diagram showing another device for indicating a location of an object according to an exemplary embodiment.

FIG. 11B is a block diagram showing another device for identifying a location of an object according to an exemplary embodiment. On the basis of the embodiment as shown in FIG. 11A, the obtaining module 91 as shown in FIG. 11B may further include a saving submodule 913.

The saving submodule 913 is configured to, before the determining submodule 912 determines whether the object information of the scanned object is in a pre-stored object information table, receive and save the object information table, wherein the object information table includes object information of one or more objects with which the object whose location is to be indicated on a display is associated.

With respect to the devices in the above embodiments, the specific manners for performing operations for individual modules/submodules therein have been described in detail in the embodiments regarding the methods, which will not be elaborated herein.

It is noted that the various modules, sub-modules, units, or components described in the present disclosure can be implemented using any suitable technology. In an example, a module, submodule, unit, or component can be implemented using circuitry such as an integrated circuit (IC). In an example, a module, submodule, unit, or component can be implemented as processing circuitry executing software instructions.

Figure 12:
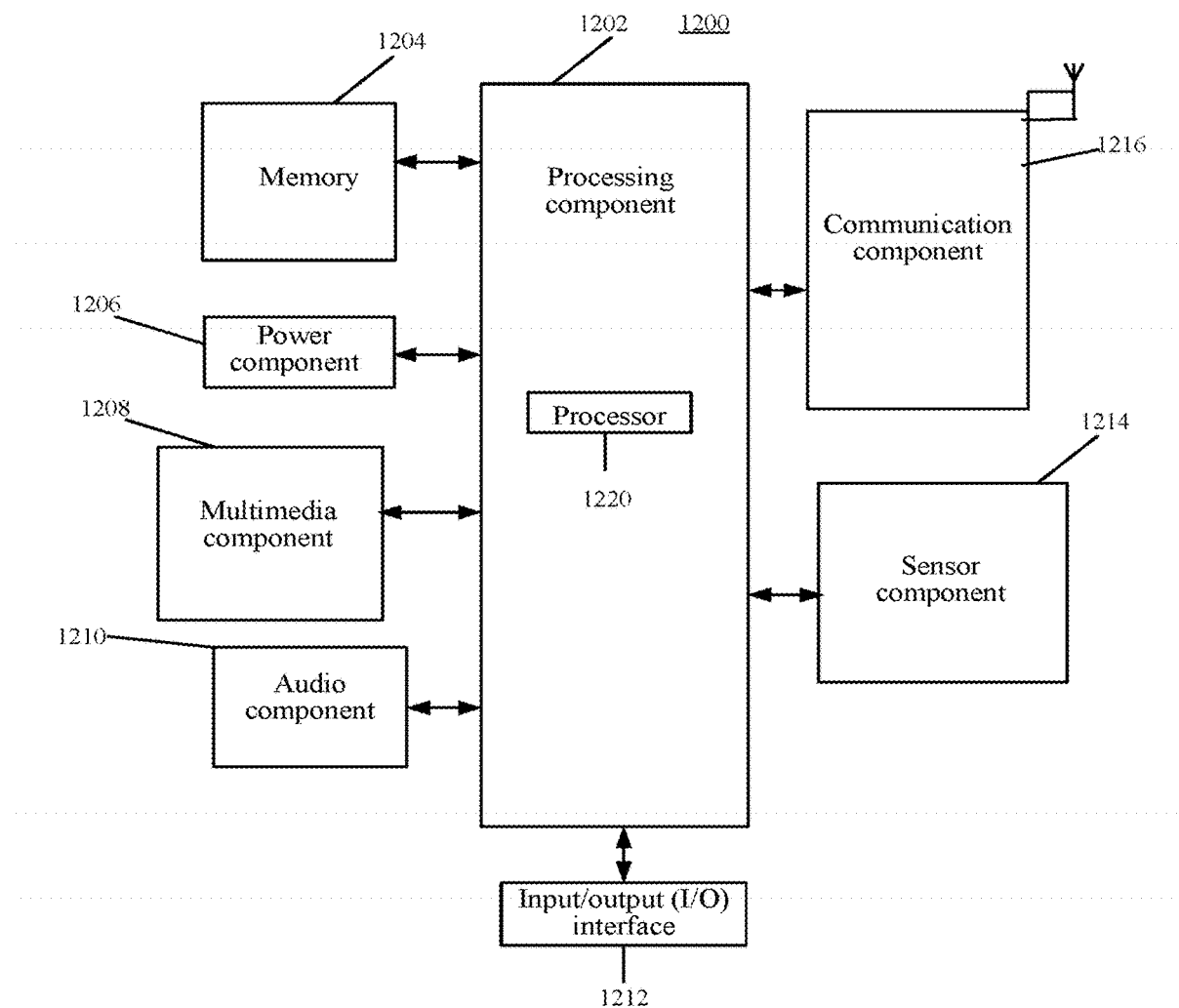
FIG. 12 is a block diagram showing a structure applicable in a device for indicating a location of an object according to an exemplary embodiment.

FIG. 12 is a block diagram showing a structure applicable in a device for identifying a location of an object according to an exemplary embodiment. For example, the device 1200 may be a mobile phone, a computer, a digital broadcast terminal, a messaging device, a gaming console, a tablet, a medical device, exercise equipment, a personal digital assistant, smart glasses, or a camera, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for indicating a location of an object of interest, the method comprising:
   identifying, using a wearable device or an image recognition device, a target object of a user of the wearable device;
   identifying the object of interest that is associated with the target object by querying a pre-stored object association table according to the identified target object, the location of the object of interest being different from a location of the target object; and
   in response to a preset condition being satisfied after identifying the object of interest, locating the object of interest and highlighting the object of interest on a display of the wearable device,
   wherein the preset condition includes detection of an angle variation of the wearable device exceeding a preset angle threshold.

2. The method according to claim 1, further comprising:
   receiving and saving the object association table, wherein the object association table comprises information regarding associations among various objects.

3. The method according to claim 1, further comprising:
   receiving behavior information through an input interface, and saving the behavior information; or
   generating the behavior information based on detected parameters, and saving the behavior information.

4. The method according to claim 3, further comprising determining whether the preset condition is satisfied by performing one or more of:
   determining a current time corresponding to a time recorded in the pre-stored behavior information; or
   determining a current location corresponding to a location recorded in the pre-stored behavior information.

5. The method according to claim 1, further comprising determining whether the preset condition is satisfied by performing:
   determining whether a function of highlighting the object of interest on the display is activated.

6. The method according to claim 1, wherein highlighting the object of interest on the display comprises:
   displaying the object of interest with a part or an entirety of the object of interest enlarged on the display; or
   displaying the object of interest in a flashing effect on the display.

7. The method according to claim 1, wherein the identifying the target object of the user of the wearable device comprises identifying, as the target object, an object at which the user stares for a time period.

8. A method for indicating a location of an object of interest, comprising:
   recognizing, by an image recognition device, a target object of a user of a wearable device; and
   sending information regarding the recognized target object to the wearable device, so that the wearable device identifies the object of interest that is associated with the target object by querying a pre-stored object association table according to the identified target object, locates the object of interest in response to a preset condition being satisfied, and highlights the object of interest on a display of the wearable device, the location of the object of interest being different from a location of the target object,
   wherein the preset condition includes detection of an angle variation of the wearable device exceeding a preset angle threshold.

9. The method according to claim 8, wherein recognizing the target object comprises:
   scanning for a scanned object within a current view range of the image recognition device;
   determining whether the scanned object is indicated in a pre-stored object information table; and
   when the scanned object is indicated in the pre-stored object information table, determining the scanned object as the target object.

10. The method according to claim 9, further comprising:
    receiving and saving the object information table, wherein the object information table comprises information of one or more objects associated with the object of interest.

11. A device for indicating a location of an object of interest, comprising:
    a processor; and
    a memory for storing instructions executable by the processor,
    wherein the processor is configured to
    identify, using the device or an image recognition device, a target object of a user of the device;
    identify the object of interest that is associated with the target object by querying a pre-stored object association table according to the identified target object, the location of the object of interest being different from a location of the target object; and
    in response to a preset condition being satisfied after identifying the object of interest, locate the object of interest and highlight the object of interest on a display of the device,
    wherein the preset condition includes detection of an angle variation of the device exceeding a preset angle threshold.

12. The device according to claim 11, wherein the processor is configured to
    receive and save the object association table, wherein the object association table comprises information regarding associations among various objects.

13. The device according to claim 11, wherein the processor is configured to
    receive user behavior information through an input interface, and save the behavior information; or
    generate the user behavior information based on detected parameters, and save the user behavior information.

14. The device according to claim 13, wherein the processor is configured to determine whether the preset condition is satisfied by performing one or more of
    determining a current time corresponding to a time recorded in the pre-stored behavior information; or
    determining a current location corresponding to a location recorded in the pre-stored behavior information.

15. The device according to claim 11, wherein the processor is configured to determine whether the preset condition is satisfied by performing
    determining whether a function of highlighting the object of interest on the display is activated.

16. The device according to claim 11, wherein, when highlighting the object of interest on the display, the processor is configured to:
    display the object of interest with a part or an entirety of the object of interest enlarged on the display; or
    display the object of interest with a flashing effect on the display.

17. The device according to claim 11, wherein the processor is configured to identify, as the target object, an object at which the user stares for a time period.

18. A device for indicating a location of an object of interest, comprising:
   a processor; and
   a memory for storing instructions executable by the processor;
   wherein the processor is configured to
   recognize a target object of a user of a wearable device; and
   send information regarding the recognized target object to the wearable device, so that the wearable device identifies the object of interest that is associated with the target object by querying a pre-stored object association table according to the identified target object, locates the object of interest in response to a preset condition being satisfied, and highlights the object of interest on a display of the wearable device, the location of the object of interest being different from a location of the target object,
   wherein the preset condition includes detection of an angle variation of the wearable device exceeding a preset angle threshold.

19. A non-transitory computer-readable storage medium having stored therein instructions that, when executed by a processor of a wearable device, causes the wearable device to perform a method for indicating a location of an object of interest, the method comprising:
   identifying, using the wearable device or an image recognition device, a target object of a user of the wearable device;
   identifying the object of interest that is associated with the target object by querying a pre-stored object association table according to the identified target object, the location of the object of interest being different from a location of the target object; and
   in response to a preset condition being satisfied after identifying the object of interest, locating the object of interest and highlighting the object of interest on a display of the wearable device,
   wherein the preset condition includes detection of an angle variation of the wearable device exceeding a preset angle threshold.

20. A non-transitory computer-readable storage medium having stored therein instructions that, when executed by a processor of an image recognition device, causes the image recognition device to perform a method for indicating a location of an object of interest, the method comprising:
   recognizing a target object of a user of a wearable device; and
   sending information regarding the recognized target object to the wearable device, so that the wearable device identifies the object of interest that is associated with the target object by querying a pre-stored object association table according to the identified target object, locates the object of interest in response to a preset condition being satisfied, and highlights the object of interest on a display of the wearable device, the location of the object of interest being different from a location of the target object,
   wherein the preset condition includes detection of an angle variation of the wearable device exceeding a preset angle threshold.

* * * * *